US009606518B2

(12) United States Patent
Evans et al.

(10) Patent No.: US 9,606,518 B2
(45) Date of Patent: Mar. 28, 2017

(54) CONTROL SYSTEM AND METHOD OF PREDICTING WIND TURBINE POWER GENERATION

(75) Inventors: Scott Charles Evans, Burnt Hills, NY (US); John Anderson Fergus Ross, Niskayuna, NY (US); Colin Craig McCulloch, Charlton, NY (US); Lang Tong, Ithaca, NY (US); Peter Alan Gregg, Niskayuna, NY (US); John David Hilton, Jr., East Greenbush, NY (US); Andrew Ferree, Latham, NY (US); Joshua Benjamin Schoenstedt, Ballston Lake, NY (US); Waseem Ibrahim Faidi, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 1196 days.

(21) Appl. No.: 13/339,153

(22) Filed: Dec. 28, 2011

(65) Prior Publication Data
US 2012/0101644 A1    Apr. 26, 2012

(51) Int. Cl.
  *G05D 3/12*     (2006.01)
  *G05D 5/00*     (2006.01)
  *G05D 9/00*     (2006.01)
  *G05B 13/02*    (2006.01)

(52) U.S. Cl.
  CPC ................................. *G05B 13/026* (2013.01)

(58) Field of Classification Search
  CPC ....... Y02E 10/723; Y02E 10/72; G06G 50/06; H02J 3/14; H02J 3/00; G05B 13/026
  USPC ........................................ 700/286, 287, 291
  See application file for complete search history.

(56) References Cited

U.S. PATENT DOCUMENTS

| | | | |
|---|---|---|---|
| 6,975,925 B1 * | 12/2005 | Barnes et al. | 700/286 |
| 7,403,854 B1 | 7/2008 | Hurley et al. | |
| 7,677,869 B2 * | 3/2010 | Martinez De Lizarduy Romo | F03D 1/003 416/36 |
| 8,583,572 B1 * | 11/2013 | Engler | 706/13 |
| 2002/0087234 A1 * | 7/2002 | Lof | F03D 7/0284 700/286 |
| 2004/0183307 A1 * | 9/2004 | Yoshida | F03D 7/0204 290/44 |
| 2007/0125165 A1 * | 6/2007 | Ormel et al. | 73/170.01 |
| 2009/0027002 A1 * | 1/2009 | Stahlkopf | 320/101 |
| 2010/0268849 A1 * | 10/2010 | Bengtson et al. | 709/248 |
| 2011/0270450 A1 * | 11/2011 | Gujjar | F03D 7/048 700/287 |
| 2011/0301769 A1 * | 12/2011 | Lovmand et al. | 700/287 |

FOREIGN PATENT DOCUMENTS

WO    2005047999    5/2005

* cited by examiner

*Primary Examiner* — Ziaul Karim
(74) *Attorney, Agent, or Firm* — P. K. Chakrabarti (57) ABSTRACT

A control system for use with a plurality of wind turbines includes a processor and a memory device coupled to the processor. The memory device is configured to store a plurality of program modules that, when executed by the processor, configure the processor to receive data representative of a power generation of a first wind turbine of the plurality of wind turbines, and determine an expected power generation of a second wind turbine of the plurality of wind turbines based on the power generation of the first wind turbine.

12 Claims, 5 Drawing Sheets

CONTROL SYSTEM AND METHOD OF PREDICTING WIND TURBINE POWER GENERATION

BACKGROUND OF THE INVENTION

The subject matter described herein relates generally to wind turbines and, more particularly, to a control system and a method of predicting power generation of one or more wind turbines within a wind farm.

Generally, a wind turbine includes a rotor that includes a rotatable hub assembly having multiple rotor blades. The rotor blades transform wind energy into a mechanical rotational torque that drives one or more generators using the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid through at least one electrical connection. Gearless direct drive wind turbines also exist. The rotor, generator, gearbox and other components are typically mounted within a housing, or nacelle, that is positioned on top of a tower.

At least some known wind turbines are arranged in localized groups known as wind farms. Generally, each wind turbine is positioned within the wind farm to optimize power production of the wind farm. For example, each wind turbine may be positioned within the wind farm in a location that is expected to convert a desired amount of wind power to electrical power based on topographical characteristics of the farm.

To forecast power production of a wind farm, one or more predictive models may be used to predict the power output of individual wind turbines within the wind farm. Known models typically predict the power output of the wind turbines based on the speed and direction of the wind flowing through the wind farm. Such models, however, may calculate expected power outputs that have high error rates when compared to actual power outputs measured by the wind turbines.

BRIEF DESCRIPTION OF THE INVENTION

In one embodiment, a control system for use with a plurality of wind turbines is provided that includes a processor and a memory device coupled to the processor. The memory device is configured to store a plurality of program modules that, when executed by the processor, configure the processor to receive data representative of a power generation of a first wind turbine of the plurality of wind turbines, and determine an expected power generation of a second wind turbine of the plurality of wind turbines based on the power generation of the first wind turbine.

In another embodiment, a method of predicting a power generation of a wind turbine is provided that includes receiving, by a control system, data representative of a power generation of a first wind turbine of a plurality of wind turbines. The method also includes determining, by the control system, an expected power generation of a second wind turbine of the plurality of wind turbines based on the power generation of the first wind turbine.

DETAILED DESCRIPTION OF THE INVENTION

Figure 1:
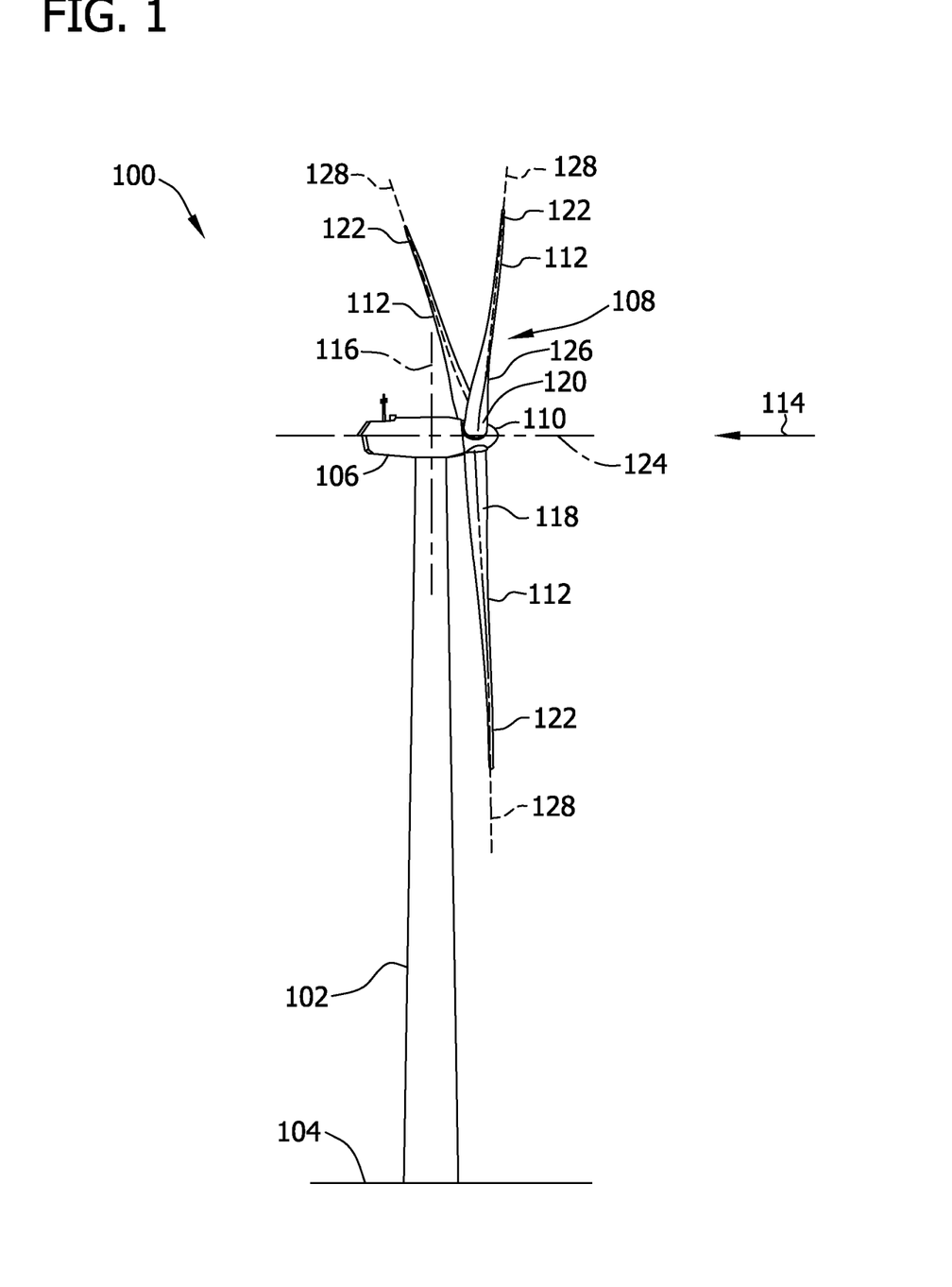
FIG. 1 is a perspective view of an exemplary wind turbine.

FIG. 1 is a schematic view of an exemplary wind turbine 100. In the exemplary embodiment, wind turbine 100 is a horizontal-axis wind turbine. Alternatively, wind turbine 100 may be a vertical-axis wind turbine. In the exemplary embodiment, wind turbine 100 includes a tower 102 extending from and coupled to a supporting surface 104. Tower 102 may be coupled to surface 104 with anchor bolts or via a foundation mounting piece (neither shown), for example. A nacelle 106 is coupled to tower 102, and a rotor 108 is coupled to nacelle 106. Rotor 108 includes a rotatable hub 110 and a plurality of rotor blades 112 coupled to hub 110. In the exemplary embodiment, rotor 108 includes three rotor blades 112. Alternatively, rotor 108 may have any suitable number of rotor blades 112 that enables wind turbine 100 to function as described herein. Tower 102 may have any suitable height and/or construction that enables wind turbine 100 to function as described herein.

Rotor blades 112 are spaced about hub 110 to facilitate rotating rotor 108, thereby transferring kinetic energy from wind 114 into usable mechanical energy, and subsequently, electrical energy. Rotor 108 and nacelle 106 are rotated about tower 102 on a yaw axis 116 to control a perspective of rotor blades 112 with respect to a direction of wind 114. Rotor blades 112 are mated to hub 110 by coupling a rotor blade root portion 118 to hub 110 at a plurality of load transfer regions 120. Load transfer regions 120 each have a hub load transfer region and a rotor blade load transfer region (both not shown in FIG. 1). Loads induced to rotor blades 112 are transferred to hub 110 via load transfer regions 120. Each rotor blade 112 also includes a rotor blade tip portion 122.

In the exemplary embodiment, rotor blades 112 have a length of between approximately 30 meters (m) (99 feet (ft)) and approximately 120 m (394 ft). Alternatively, rotor blades 112 may have any suitable length that enables wind turbine 100 to function as described herein. For example, rotor blades 112 may have a suitable length less than 30 m or greater than 120 m. As wind 114 contacts rotor blade 112, lift forces are induced to rotor blade 112 and rotation of rotor 108 about an axis of rotation 124 is induced as rotor blade tip portion 122 is accelerated.

A pitch angle (not shown) of rotor blades 112, i.e., an angle that determines the perspective of rotor blade 112 with respect to the direction of wind 114, may be changed by a pitch assembly (not shown in FIG. 1). More specifically, increasing a pitch angle of rotor blade 112 decreases an amount of rotor blade surface area 126 exposed to wind 114 and, conversely, decreasing a pitch angle of rotor blade 112 increases an amount of rotor blade surface area 126 exposed to wind 114. The pitch angles of rotor blades 112 are adjusted about a pitch axis 128 at each rotor blade 112. In the exemplary embodiment, the pitch angles of rotor blades 112 are controlled individually.

Figure 2:
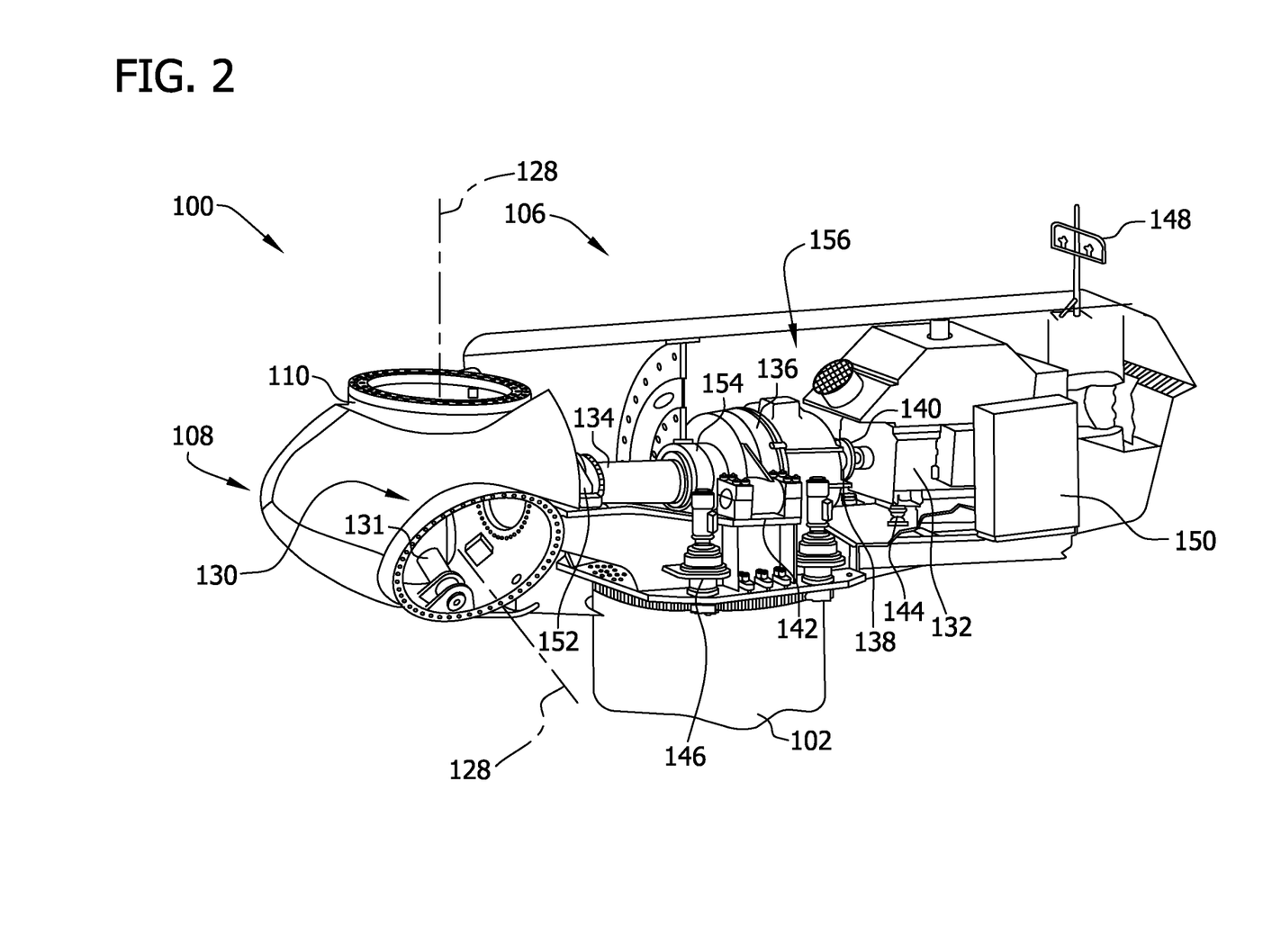
FIG. 2 is a partial sectional view of an exemplary nacelle suitable for use with the wind turbine shown in FIG. 1.

FIG. 2 is a partial sectional view of nacelle 106 of exemplary wind turbine 100 (shown in FIG. 1). Various components of wind turbine 100 are housed in nacelle 106. In the exemplary embodiment, nacelle 106 includes three pitch assemblies 130. Each pitch assembly 130 is coupled to an associated rotor blade 112 (shown in FIG. 1), and modulates a pitch of an associated rotor blade 112 about pitch axis 128. Only one of three pitch assemblies 130 is shown in FIG. 2. In the exemplary embodiment, each pitch assembly 130 includes at least one pitch drive motor 131.

As shown in FIG. 2, rotor 108 is rotatably coupled to an electric generator 132 positioned within nacelle 106 via a rotor shaft 134 (sometimes referred to as either a main shaft or a low speed shaft), a gearbox 136, a high speed shaft 138, and a coupling 140. Rotation of rotor shaft 134 rotatably drives gearbox 136 that subsequently drives high speed shaft 138. High speed shaft 138 rotatably drives generator 132 via coupling 140 and rotation of high speed shaft 138 facilitates production of electrical power by generator 132. Gearbox 136 is supported by a support 142 and generator 132 is supported by a support 144. In the exemplary embodiment, gearbox 136 utilizes a dual path geometry to drive high speed shaft 138. Alternatively, rotor shaft 134 is coupled directly to generator 132 via coupling 140.

Nacelle 106 also includes a yaw drive mechanism 146 that rotates nacelle 106 and rotor 108 about yaw axis 116 (shown in FIG. 1) to control the perspective of rotor blades 112 with respect to the direction of wind 114. Nacelle 106 also includes at least one meteorological mast 148 that includes a wind vane and anemometer (neither shown in FIG. 2). In one embodiment, meteorological mast 148 provides information, including wind direction and/or wind speed, to a turbine control system 150. Turbine control system 150 includes one or more controllers or other processors configured to execute control algorithms. As used herein, the term "processor" includes any programmable system including systems and microcontrollers, reduced instruction set circuits (RISC), application specific integrated circuits (ASIC), programmable logic circuits (PLC), and any other circuit capable of executing the functions described herein. The above examples are exemplary only, and thus are not intended to limit in any way the definition and/or meaning of the term processor. Moreover, turbine control system 150 may execute a SCADA (Supervisory, Control and Data Acquisition) program.

Pitch assembly 130 is operatively coupled to turbine control system 150. In the exemplary embodiment, nacelle 106 also includes a forward support bearing 152 and an aft support bearing 154. Forward support bearing 152 and aft support bearing 154 facilitate radial support and alignment of rotor shaft 134. Forward support bearing 152 is coupled to rotor shaft 134 near hub 110. Aft support bearing 154 is positioned on rotor shaft 134 near gearbox 136 and/or generator 132. Nacelle 106 may include any number of support bearings that enable wind turbine 100 to function as disclosed herein. Rotor shaft 134, generator 132, gearbox 136, high speed shaft 138, coupling 140, and any associated fastening, support, and/or securing device including, but not limited to, support 142, support 144, forward support bearing 152, and aft support bearing 154, are sometimes referred to as a drive train 156.

Figure 3:
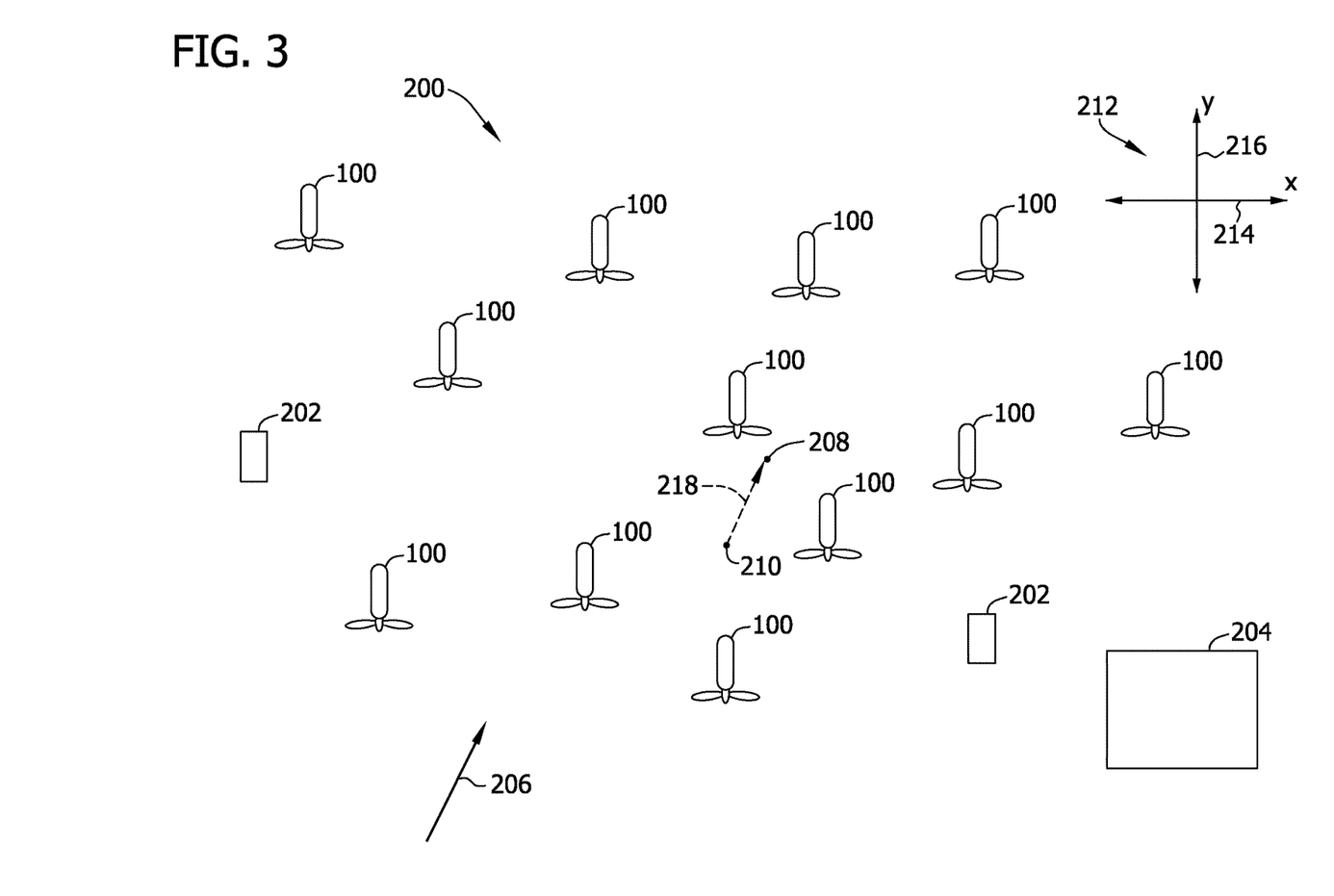
FIG. 3 is a top view of an exemplary wind farm that may include the wind turbine shown in FIG. 1.

FIG. 3 is a top view of an exemplary wind farm 200. In the exemplary embodiment, wind farm 200 includes a plurality of wind turbines 100 coupled to each other by a wired and/or wireless network (not shown) that interfaces with a respective turbine control system 150 (shown in FIG. 2) of each wind turbine 100. Wind farm 200 also includes one or more meteorological towers 202 and a central control system 204. In the exemplary embodiment, each wind turbine 100 and each meteorological tower 202 is coupled to central control system 204 through the network.

In the exemplary embodiment, each meteorological tower 202 detects and/or measures one or more environmental conditions within, or proximate to, wind farm 200. The environmental conditions include, without limitation, a wind direction 206, a wind speed, an air pressure, an air density, an air temperature, and/or any other condition that enables wind farm 200 to function as described herein. It should be recognized that the environmental conditions may vary throughout wind farm 200 such that environmental conditions measured by one meteorological tower 202 may be different than the environmental conditions measured by another meteorological tower 202, or may be different than the environmental conditions existing in locations distant from towers 202. Meteorological towers 202 transmit data representative of the measured or detected environmental conditions (hereinafter referred to as "environmental condition data") to central control system 204 and/or to wind turbines 100. It should also be recognized that wind turbines 100 can measure environmental conditions at, or proximate to, wind turbines 100, for example, using meteorological mast 148 (shown in FIG. 1) or other sensors of wind turbines 100.

Central control system 204, in the exemplary embodiment, controls and/or monitors an operation of wind farm 200. Control system 204 receives environmental condition data from meteorological towers 202 and/or from wind turbines 100. In addition, central control system 204 receives data representative of one or more operating conditions (hereinafter referred to as "operating condition data") of wind turbines 100. The operating condition data includes, without limitation, a power generation or output of wind turbine 100, a rotational speed of wind turbine 100 (i.e., of rotor 108), a status of wind turbine 100, and/or any other data that enables central control system 204 to function as described herein. Alternatively, wind farm 200 does not include central control system 204, and the functions of central control system 204 are performed in a distributed manner by turbine control systems 150 of wind turbines 100 within farm 200.

In the exemplary embodiment, central control system 204 calculates or determines a physical center 208 of wind farm 200 and a power generation center 210 of wind farm 200. In the exemplary embodiment, physical center 208 is a location that is an average of values representative of the physical location of each wind turbine 100 of wind farm 200. For example, if wind turbines 100 within wind farm 200 are arranged in a two-dimensional Cartesian plane 212 having an x-axis 214 and a y-axis 216, an x-coordinate (along x-axis 214) of physical center 208 is equal to an average of the x-coordinates of each wind turbine 100 location, and a y-coordinate (along y-axis 216) of physical center 208 is equal to an average of the y-coordinates of each wind turbine 100 location.

In the exemplary embodiment, power generation center 210 is a location that is in a center of a power distribution of wind farm 200. For example, central control system 204 determines power generation center 210 by assigning, to each wind turbine 100, a coefficient or "weight value" that is proportional to an amount of power that each wind turbine 100 is generating. If wind farm 200 is arranged in Cartesian plane 212 described above, central control system 204 multiplies the x-coordinates and the y-coordinates of each wind turbine 100 by the weight value to obtain weighted coordinate values for each wind turbine 100. Central control system 204 determines the power generation center 210 to be the average of the weighted x-coordinates and y-coordinates of wind turbines 100 within wind farm 200. It should be recognized that power generation center 210 may vary over time as the power generation of each wind turbine 100 varies, even though physical center 208 may be fixed.

Central control system 204 estimates the wind direction based on physical center 208 and power generation center 210. For example, central control system 204 determines an estimated wind direction 218 by generating a vector from power generation center 210 to physical center 208, or by calculating an arctangent of the distance between power generation center 210 and physical center 208 in a y-direction (i.e., in a direction parallel to y-axis 216) divided by the distance between power generation center 210 and physical center 208 in an x-direction (i.e., in a direction parallel to x-axis 214), minus 180 degrees. Estimated wind direction 218 may be used to validate wind direction 206 measured by meteorological towers 202 and/or may be used to determine wind direction 206 with greater accuracy within wind farm 200 as compared to determining wind direction 206 solely from towers 202 and/or from wind turbine sensors.

In addition, as described more fully below, central control system 204 determines or predicts an amount of power expected to be generated by each wind turbine 100 within wind farm 200 (hereinafter referred to as a "power generation" of each wind turbine 100) using data received from meteorological towers 202 and wind turbines 100. More specifically, central control system 204 may determine an expected power generation of each wind turbine 100 at a time in the future (hereinafter referred to as an "expected future power generation") and/or at the current time (hereinafter referred to as an "expected current power generation").

Figure 4:
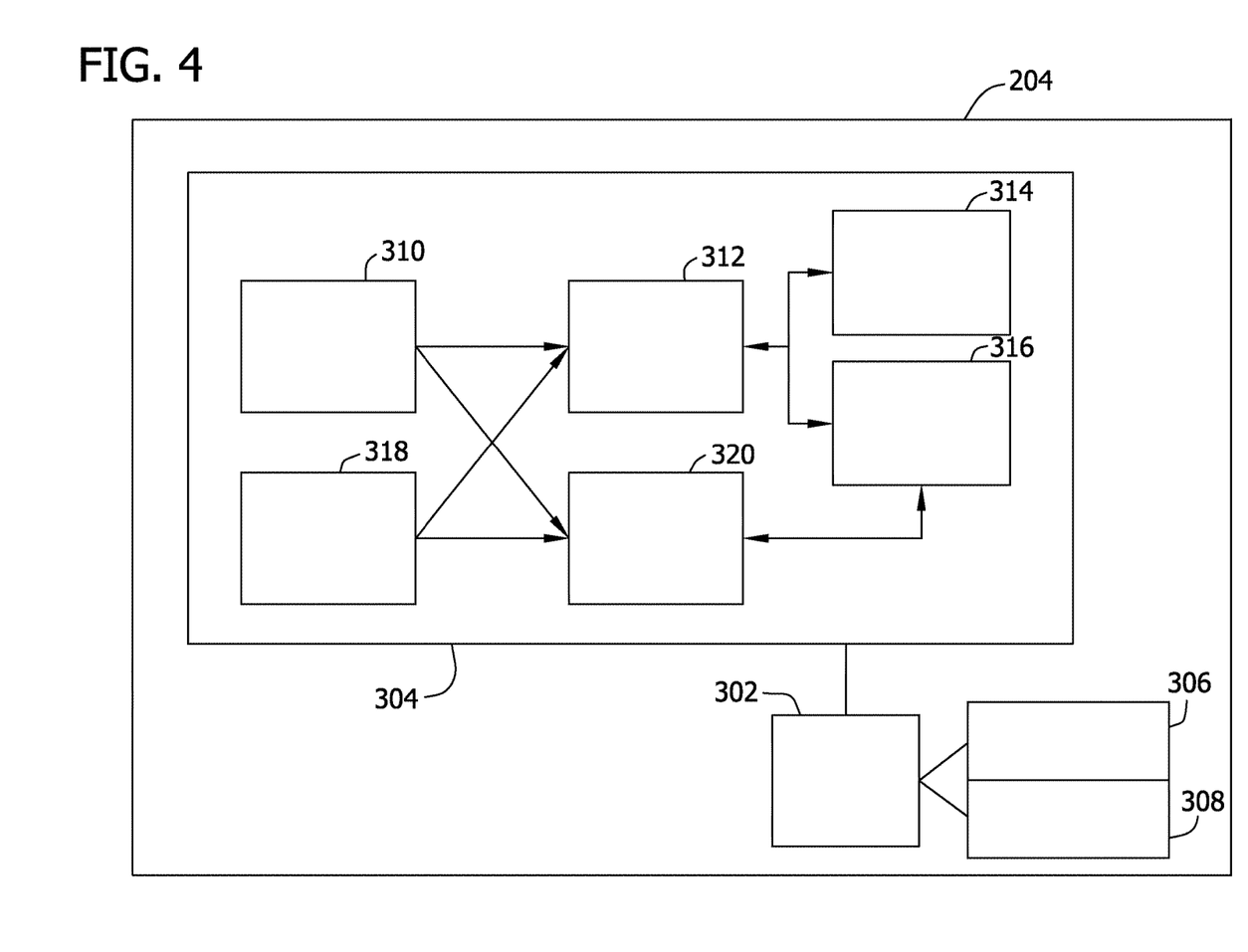
FIG. 4 is a block diagram of an exemplary central control system that may be used with the wind farm shown in FIG. 3.

FIG. 4 is a block diagram of an exemplary central control system 204 that may be used with wind farm 200 (shown in FIG. 3). In the exemplary embodiment, central control system 204 includes a processor 302, and a memory device 304, a display 306, and a communication interface 308 coupled to processor 302.

Processor 302 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 304 includes a computer readable storage medium, such as, without limitation, random access memory (RAM), flash memory, a hard disk drive, a solid state drive, a diskette, a flash drive, a compact disc, a digital video disc, and/or any suitable memory. In the exemplary embodiment, memory device 304 includes data and/or instructions that are executable by processor 302 (i.e., processor 302 is programmed by the instructions) to enable processor 302 to perform the functions described herein.

Display 306 includes, without limitation, a liquid crystal display (LCD), a vacuum fluorescent display (VFD), a cathode ray tube (CRT), a plasma display, a light-emitting diode (LED) display, one or more LEDs, and/or any suitable visual output device capable of displaying graphical data and text to a user. In one embodiment, display 306 is positioned remotely from central control system 204 and data is transmitted from central control system 204 to display 306 through a network.

Communication interface 308 may include, without limitation, a network interface controller (MC), a network adapter, a transceiver, a public switched telephone network (PSTN) interface controller, or any other device that enables central control system 204 to operate as described herein. In the exemplary embodiment, communication interface 308 connects to wind turbines 100 and meteorological towers 202 (shown in FIG. 3) within wind farm 200 using any suitable wired or wireless communication protocol.

In the exemplary embodiment, memory device 304 includes a plurality of computer-executable program modules that are executed by processor 302. The program modules include a data aggregation module 310, a current power prediction module 312, a current power comparison module 314, and a baselining module 316. In addition, the program modules include a condition modeling module 318 and a future power prediction module 320.

Data aggregation module 310, in the exemplary embodiment, receives data, such as environmental condition data and/or operating condition data (collectively referred to as "wind farm data"), from meteorological towers 202 and/or from wind turbines 100 within wind farm 200. In the exemplary embodiment, central control system 204 may designate a wind turbine 100 to be monitored (i.e., a "monitored wind turbine 100"). Data aggregation module 310 receives the wind farm data from meteorological towers 202 and/or from each wind turbine 100 other than monitored wind turbine 100 (also referred to as the "remaining wind turbines 100"), in addition to receiving wind farm data from monitored wind turbine 100. Data aggregation module 310 transmits at least a portion of the wind farm data to current power prediction module 312 and to future power prediction module 320. For example, data aggregation module 310 transmits the power generation data of each remaining wind turbine 100, a wind speed, and a wind direction to current power prediction module 312 to determine the expected power generation of monitored wind turbine 100, and to future power prediction module 320 to determine the expected future power generation of monitored wind turbine 100.

In one embodiment, condition modeling module 318 models or estimates one or more environmental conditions, operating conditions, and/or any other aspects of wind farm 200. For example, condition modeling module 318 determines power generation center 210 and models, or estimates, a wind direction within wind farm 200 based on power generation center 210 and physical center 208, as described above with reference to FIG. 3. In one embodiment, condition modeling module 318 also models or estimates a speed of the wind travelling through wind farm 200 and/or a delay in the arrival of the wind at individual wind turbines 100 within wind farm 200 based on data received from wind turbines 100 and/or meteorological towers 202. Condition modeling module 318 transmits modeled conditions to current power prediction module 312 and to future power prediction module 320.

In the exemplary embodiment, current power prediction module 312 predicts or determines an expected current power generation of monitored wind turbine 100. As used herein, the term "predict" not only refers to estimating a condition or value in the future, but also refers to estimating a condition or value at the current time. In the exemplary embodiment, current power prediction module 312 determines the expected current power generation of monitored wind turbine 100 using a power prediction model, e.g., a linear regression model, based on the power generation of the remaining wind turbines 100. In addition, data (e.g., environmental data) received from meteorological towers 202 and a wind speed and/or direction measured at nacelles 106 (shown in FIG. 1) or determined by central control system 204 may be used to increase an accuracy of the estimation. Accordingly, current power prediction module 312 predicts or determines the expected current power generation of monitored wind turbine 100 based on the power generation of remaining wind turbines 100 and based on the determined wind speed and direction within wind farm 200. Current power prediction module 312 transmits a value representative of the expected current power generation to current power comparison module 314.

Current power comparison module 314 determines whether monitored wind turbine 100 is operating properly based on the expected current power generation value. More specifically, current power comparison module 314 determines whether monitored wind turbine 100 is generating a suitable amount of power by receiving a value representative of an actual power generation of monitored wind turbine 100 and comparing the actual power generation value with the expected current power generation value. If the difference between the actual power generation value and the expected current power generation value is equal to, or less than, a predetermined threshold value, current power comparison module 314 determines that monitored wind turbine 100 is operating properly. However, if the difference between the actual power generation value and the expected current power generation value is greater than the predetermined threshold value, current power comparison module 314 determines that monitored wind turbine 100 is not operating properly (i.e., that monitored wind turbine 100 is not generating a suitable or expected amount of power).

In one embodiment, current power comparison module 314 compares an output of the power prediction model representative of an expected characteristic of monitored wind turbine 100, such as an expected power generation of monitored wind turbine 100 and/or any other output, to an actual or measured characteristic of monitored wind turbine 100. For example, current power comparison module 314 may compare the expected power generation to a moving average of the measured power generation of wind turbine 100 over a period of time. Additionally or alternatively, the output of the model may be compared to other heuristics or statistical characteristics of monitored wind turbine 100, such as a standard deviation of the measured power generation values of turbine 100 over a period of time, a similarity metric based on the measured power generation or another characteristic of monitored wind turbine 100, and/or any other metric or determination that enables current power comparison module 314 to determine whether the output of the model substantially matches, or "tracks," actual data for monitored wind turbine 100.

If current power comparison module 314 determines that monitored wind turbine 100 is not operating properly, central control system 204 may implement one or more corrective actions and/or may transmit one or more signals to a diagnostic unit (not shown) for analysis and/or to implement corrective action. In addition, current power comparison module 314 generates a notification, such as an error message, and transmits the notification to a user or a remote device, for example, using display 306 and/or communication interface 308. More specifically, in one embodiment, current power comparison module 314 generates a notification if an output of the power prediction model that is representative of an expected value of a characteristic or a set of characteristics of monitored wind turbine 100 does not match a measured value of the characteristic or set of characteristics over a period or interval of time.

In one embodiment, if monitored wind turbine 100 is determined to operate properly, baselining module 316 models or estimates an effect of one or more changes to monitored wind turbine 100, for example, with respect to a power generation of monitored wind turbine 100. More specifically, baselining module 316 receives an input from a user or a remote device that is indicative of a change to a component or a parameter of monitored wind turbine 100. The change may include an upgrade to a component, such as a change to a shape or a material of a rotor blade 112 and/or any other change to any other component of monitored wind turbine 100 that enables wind turbine 100 to function as described herein. The change may also include a change to a parameter, such as a parameter controlling a rotational speed of rotor 108 and/or any other change to any other parameter of monitored wind turbine 100 that enables wind turbine 100 to function as described herein. In one embodiment, baselining module 316 transmits data representative of the change or changes to monitored wind turbine 100 to current power prediction module 312 for estimating the expected current power generation of monitored wind turbine 100 based on the change. Similarly, baselining module 316 transmits data representative of the change or changes to monitored wind turbine 100 to future power prediction module 320 for estimating the expected future power generation of monitored wind turbine 100 based on the change.

In the exemplary embodiment, future power prediction module 320 receives the wind farm data from data aggregation module 310 and/or the modeled conditions from condition modeling module 318. Future power prediction module 320 predicts or determines an expected future power generation of monitored wind turbine 100. In the exemplary embodiment, future power prediction module 320 determines the expected future power generation of monitored wind turbine 100 using a fractional autoregressive integrated moving average (FARIMA) model based on a time series of power generation data received from monitored wind turbine 100. More specifically, experimental results indicate that the power generation of a wind turbine 100 exhibits a high degree of self-similarity over time. Accordingly, historical values of the power generation of monitored wind turbine 100 are received by future power prediction module 320 and the values are arranged into a time series of power generation data. The FARIMA model is used to predict the future power generation based on the time series. In addition, data received from meteorological towers 202 and a wind speed and/or direction measured at nacelles 106 or determined by central control system 204 may be used to increase an accuracy of the determination or prediction. Alternatively, a Kalman filter, one or more machine learning techniques or algorithms, one or more statistical model inference techniques or algorithms, and/or a particle filter may be used to predict the future power generation of monitored wind turbine 100 based on the time series of power generation data of turbine 100. In one embodiment, future power prediction module 320 also predicts or determines the expected future power generation of monitored wind turbine 100 based on the data received from baselining module 316 that is representative of the change or changes to wind turbine 100.

In the exemplary embodiment, values representative of the expected current power generation and the expected future power generation are transmitted to display 306 for displaying to a user. Additionally or alternatively, the values representative of the expected current power generation and the expected future power generation are transmitted to communication interface 308 for transmitting the values to wind turbines 100 or to another device or system.

In the exemplary embodiment, central control system 204 determines the expected current power generation and/or the expected future power generation values for each wind turbine 100 within wind farm 200. Control system 204 transmits one or more commands to wind turbines 100 to adjust and/or increase the power generation of wind turbines 100 based on the expected current power generation and/or the expected future power generation of each wind turbine 100.

Figure 5:
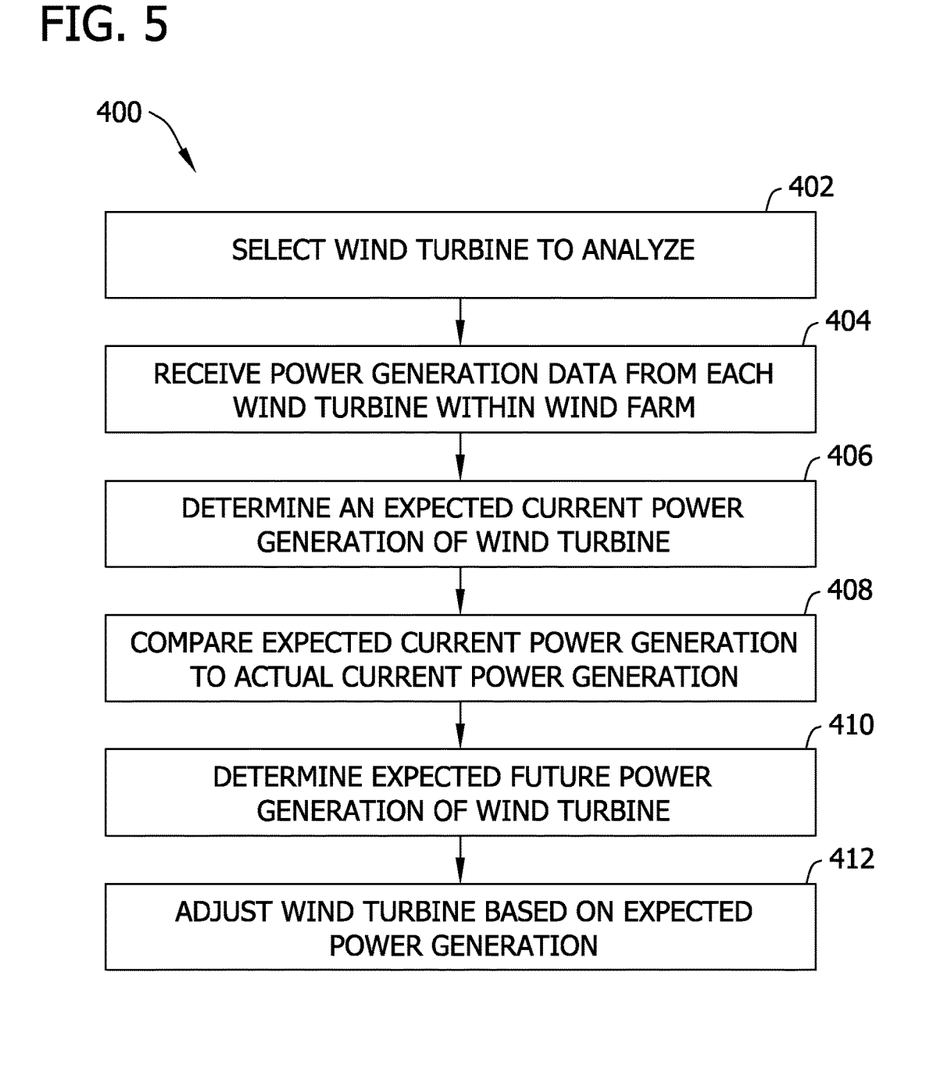
FIG. 5 is a flow diagram of an exemplary method of predicting a power generation of a wind turbine suitable for use with the wind farm shown in FIG. 3.

FIG. 5 is a flow diagram of an exemplary method 400 of predicting or determining an expected power generation of a wind turbine, such as wind turbine 100 (shown in FIG. 1) that is suitable for use with wind farm 200 (shown in FIG. 3). In the exemplary embodiment, method 400 is implemented by central control system 204 (shown in FIG. 3). Alternatively, method 400 is implemented in a distributed manner by turbine control systems 150 (shown in FIG. 2) of wind turbines 100 within wind farm 200.

In the exemplary embodiment, a wind turbine 100 is selected 402 to analyze or monitor (e.g., a "monitored wind turbine 100"). Power generation data is received 404 from each wind turbine 100 (e.g., from each operational wind turbine 100) within wind farm 200. In one embodiment, other wind farm data is also received, such as a speed and a direction of wind within wind farm 200, from meteorological towers 202 and/or from wind turbines 100.

An expected current power generation of monitored wind turbine 100 is determined 406 using the wind farm data received. For example, the amount of power generated (or power generation data) by each wind turbine 100 other than monitored wind turbine 100 is used to determine 406 the expected current power generation of monitored wind turbine 100. In addition, the other wind farm data, such as the wind speed, wind direction, and/or delay in the arrival of wind at one or more wind turbines 100, is used to improve an accuracy of the determination 406 of the expected current power generation.

In one embodiment, the expected current power generation is compared 408 to an actual power generation of monitored wind turbine 100. If the actual power generation of monitored wind turbine 100 is equal to the expected current power generation, or if the difference between the expected current power generation and the actual power generation is less than, or equal to, a predetermined threshold, monitored wind turbine 100 is determined to be generating a suitable amount of power. However, if the difference between the expected current power generation and the actual power generation is greater than the predetermined threshold, monitored wind turbine 100 is determined to be generating an unacceptable, or unsuitable, amount of power. The wind farm data, the expected current power generation, and/or the actual power generation may be transmitted to a diagnostic module or device to analyze a cause of the power generation discrepancy of monitored wind turbine 100.

In the exemplary embodiment, an expected future power generation of monitored wind turbine 100 is determined 410. More specifically, a time series of power generation data for monitored wind turbine 100 is determined or received from monitored wind turbine 100, or from another device or system. The time series of power generation data is input into a FARIMA model for determining 410 or predicting the expected future power generation of monitored wind turbine 100. In one embodiment, a measure of a long term memory of the time series, such as a Hurst parameter or index, may be determined, and an order of the FARIMA model may be determined using the Hurst parameter. In addition, data received from meteorological towers 202, a wind speed and/or direction measured at nacelles 106 and/or determined by central control system 204 may be used to increase an accuracy of the prediction. Alternatively, a Kalman filter and/or a particle filter may be used to determine 410 or predict the future power generation of monitored wind turbine 100 based on the time series of power generation data of turbine 100.

In the exemplary embodiment, monitored wind turbine 100 is adjusted 412 based on the expected power generation of monitored wind turbine 100, such as the expected current power generation and/or the expected future power generation determined above. For example, a rotational speed of rotor 108 may be adjusted, a pitch angle of rotor blades 112 may be adjusted, and/or any other component or parameter may be adjusted to increase or decrease the power generation of monitored wind turbine 100 and/or any other operational aspect of wind turbine 100. While method 400 is described with respect to a monitored wind turbine 100, method 400 may be executed for each wind turbine 100, or a subset of wind turbines 100, within wind farm 200 as desired.

A technical effect of the system and method described herein includes at least one of: (a) receiving, by a control system, data representative of a power generation of a first wind turbine of a plurality of wind turbines; and (b) determining, by a control system, an expected power generation of a second wind turbine of a plurality of wind turbines based on a power generation of a first wind turbine of the plurality of wind turbines.

The above-described embodiments provide an efficient and robust method of predicting a power generation of a wind turbine (e.g., a monitored wind turbine). Power generation data is received from each wind turbine within the wind farm. In addition, a direction of wind is determined by the wind turbines, one or more meteorological towers, and/or a control system coupled to each wind turbine within the wind farm. The power generation data of the wind turbines (other than the monitored wind turbine) and the direction of wind is used to determine an expected current power generation and an expected future power generation of the monitored wind turbine. The expected current power generation may be compared to an actual power generation of the monitored wind turbine to validate the monitored wind turbine operation. Accordingly, by using power generation data from each wind turbine within the wind farm and using data received from meteorological towers, an expected power generation may be determined for a monitored wind turbine with a greater level of accuracy than prior art systems.

Exemplary embodiments of a control system and a method of predicting a power generation of a wind turbine are described above in detail. The control system and method are not limited to the specific embodiments described herein, but rather, components of the control system and/or steps of the method may be utilized independently and separately from other components and/or steps described herein. For example, the control system may also be used in combination with other wind farms and methods, and is not limited to practice with only the wind farm and method as described herein. Rather, the exemplary embodiment can be implemented and utilized in connection with many other wind turbine applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A control system for use with a plurality of wind turbines, said control system comprising:
    a processor; and
    a memory device coupled to said processor, said memory device configured to store a plurality of program modules that, when executed by said processor, configure said processor to:
    receive data representative of actual power generation of a first wind turbine of the plurality of wind turbines; and
    determine an expected power generation of a second wind turbine of the plurality of wind turbines based on the actual power generation of the first wind turbine,
        wherein the processor is further configured to adjust at least one component of at least one of the plurality of wind turbines based at least in part on the expected power generation of the second wind turbine.

2. A control system in accordance with claim 1, wherein the expected power generation is an expected current power generation of the second wind turbine, said processor is further configured to compare the expected current power generation to the actual power generation of the second wind turbine.

3. A control system in accordance with claim 1, wherein said processor is configured to determine the expected power generation of the second wind turbine using a power prediction model, wherein said processor is further configured to generate a notification if an output of the power prediction model representative of an expected value of a characteristic of the second wind turbine does not match a measured value of the characteristic.

4. A control system in accordance with claim 1, wherein the expected power generation is an expected future power generation of the second wind turbine, said processor is further configured to:
    receive data representative of the actual power generation of each wind turbine of the plurality of wind turbines; and
    determine the expected future power generation of the second wind turbine based on the power generation data of each wind turbine of the plurality of wind turbines.

5. A control system in accordance with claim 4, wherein said processor is configured to determine the expected future power generation of the second wind turbine using a fractional autoregressive integrated moving average model based on the actual power generation data of each wind turbine of the plurality of wind turbines.

6. A control system in accordance with claim 1, wherein said processor is further configured to determine the expected power generation of the second wind turbine based on the actual power generation of each wind turbine of the plurality of wind turbines, based on environmental condition data received from at least one meteorological tower, and based on a speed of wind determined by each wind turbine of the plurality of wind turbines.

7. A method of predicting a power generation of a wind turbine, said method comprising:
    receiving, by a control system, data representative of the actual power generation of a first wind turbine of a plurality of wind turbines;
    determining, by the control system, an expected power generation of a second wind turbine of the plurality of wind turbines based on the actual power generation of the first wind turbine; and
    adjusting at least one component of at least one of the plurality of wind turbines based at least in part on the expected power generation of the second wind turbine.

8. A method in accordance with claim 7, wherein the expected power generation is an expected current power generation of the second wind turbine, said method further comprising comparing the expected current power generation to the actual power generation of the second wind turbine.

9. A method in accordance with claim 7, further comprising determining the expected power generation of the second wind turbine using a power prediction model and generating a notification if an output of the power prediction model representative of an expected value of a characteristic of the second wind turbine does not match a measured value of the characteristic.

10. A method in accordance with claim 7, wherein the expected power generation is an expected future power generation of the second wind turbine, said method further comprising:
    receiving data representative of the actual power generation of each wind turbine of the plurality of wind turbines; and
    determining the expected future power generation of the second wind turbine based on the actual power generation data of each wind turbine of the plurality of wind turbines, and
    adjusting at least one component of at least one of the plurality of wind turbines based at least in part on the expected power generation of the second wind turbine.

11. A method in accordance with claim 10, wherein determining the expected future power generation of the second wind turbine comprises determining the expected future power generation of the second wind turbine using a fractional autoregressive integrated moving average model based on the actual power generation data of each wind turbine of the plurality of wind turbines.

12. A method in accordance with claim 7, further comprising determining the expected power generation of the second wind turbine based on the actual power generation of each wind turbine of the plurality of wind turbines, based on environmental condition data received from at least one meteorological tower, and based on a speed of wind determined by each wind turbine of the plurality of wind turbines.

* * * * *